United States Patent [19]

Kestner

[11] Patent Number: 4,836,945

[45] Date of Patent: Jun. 6, 1989

[54] METHOD FOR SUPPRESSING DUST FROM BULK MATERIALS

[75] Inventor: Mark O. Kestner, Mendham, N.J.

[73] Assignee: Chemicoal, Inc., Mendham, N.J.

[21] Appl. No.: 114,442

[22] Filed: Oct. 28, 1987

[51] Int. Cl.$^4$ .................. C09K 3/22; C09K 17/00
[52] U.S. Cl. ................................ 252/88; 523/131; 523/132
[58] Field of Search ............ 252/88, 174.23, DIG. 2; 523/131, 132

[56] References Cited

U.S. PATENT DOCUMENTS

| | | | |
|---|---|---|---|
| 1,758,735 | 5/1930 | Conrad | 252/88 |
| 2,894,851 | 7/1959 | Booth et al. | 252/88 |
| 3,812,615 | 5/1974 | Jamison | 523/132 |
| 4,551,261 | 11/1985 | Salihar | 252/88 |
| 4,610,311 | 9/1986 | Bronner et al. | 252/88 |
| 4,642,196 | 2/1987 | Yan | 252/88 |

*Primary Examiner*—Paul Lieberman
*Assistant Examiner*—Helene Kirschner
*Attorney, Agent, or Firm*—Lerner, David, Littenberg, Krumholz & Mentlik

[57] ABSTRACT

Methods for suppressing dust from the surface of dust-producing bulk materials such as coal are disclosed including preparing an aqueous suspension of cellulosic fibers dispersed in water and applying the aqueous suspension to the surface of the dust-producing bulk materials in order to suppress dust formation from that surface. The method can comprise use of the cellulosic fiber suspensions as a residual dust suppressant, as a dust suppressant coating for stockpiles of these bulk materials, or as an additive with other encrusting formulations such as latex.

8 Claims, No Drawings

METHOD FOR SUPPRESSING DUST FROM BULK MATERIALS

FIELD OF THE INVENTION

The present invention relates to methods for suppressing dust from the surface of dust-producing bulk materials. More particularly, the present invention relates to methods for suppressing dust from the surface of coal and other such bulk materials.

BACKGROUND OF THE INVENTION

Undesired dust emissions are produced by coal and other bulk materials during their handling, storage, processing and utilization. Such dust emissions are considered to be a nuisance and, in the case of many of these bulk materials, can also constitute a health and safety hazard. As a result, dust from coal and other such bulk materials must be controlled within safe limits, which in many cases have been specified in federal, state or local legislation.

Industrial and utility plants handling and storing coal and other bulk materials have therefore found it necessary to employ a variety of control technologies in order to reduce the potential health and safety hazards posed by such dust emissions, as well as to comply with applicable legislation. These dust control technologies can be separated into the general categories of mechanical and chemical technologies. In the case of mechanical techniques, devices such as fabric filters and cyclones have been used to collect and dispose of such dust emissions. While mechanical controls can be very efficient, they do often require a large capital expenditure, and they are not always applicable to all of the unit operations that can produce dust in a typical handling and storage system.

Chemical controls, on the other hand, employ additives which are generally applied to the material as a liquid spray or foam. The most common such additive for dust control is water, which is generally applied during the unloading, crushing, or conveying operations. Water, while it is useful in suppressing dust at the point of application, quickly evaporates, thus rendering the material dusty again and, in the case of coal, also detracts from its calorific value. Various oils have also been used for dust suppression, but they are not as widely used today, primarily since they are often contaminated with toxic substances and/or because they pose a hazard to local water supplies. In Severn, U.S. Pat. No. 908,041, for example, the use of heavy mineral oil, along with sand belt dust, is disclosed for collecting and holding dust particles.

In the last two decades, a wide variety of chemical agents have been developed for the specific purpose of improving upon the performance of water and oil sprays. The most common additives to water for such purposes have been wetting agents, that is surfactants, which improve the ability of the water to wet and spread onto the particulate material. These surfactants are thus usually added in low concentrations, and can be quite effective in improving the performance of these water sprays on difficult to wet materials, such as coal. To a lesser extent, emulsifying agents and similar substances can also be added to oils to improve their effectiveness.

Foaming agents described, for example, by Salyer et al in U.S. Pat. No. 3,954,662, in this case being aqueous solutions of an interpolymer of a vinyl ester and certain partial ester compounds, have improved upon wetting agent technology, and are now widely used in several bulk material handling systems. These foaming agents are dissolved in water, and compressed or aspirated air is then used to produce a low or high expansion foam for application to the bulk material. The use of such foams permits a reduction in water consumption as compared to conventional spray systems, and is generally regarded as more effective in capturing finer particulate materials. They are, however, considerably more expensive than water or surfactant solutions.

While both water and water solutions of wetting or foaming agents are generally effective in reducing dust at the point of their application, they are unable to control dust emissions from downstream unit operations. This is particularly true during outdoor storage. A utility power plant may, for example, spray the coal with these solutions when it is unloaded from trains in order to reduce dusting during this operation. The coal, however, must then be conveyed to large outdoor stockpiles, where it remains until it is reclaimed for combustion. The length of time in such storage may vary from a few days to several months, and during this period dust emissions are produced by both wind erosion and by the movement of equipment on the piles. In such cases, conventional water sprays or treatments with wetting agents or foams do not persist in performing their described function during such storage, primarily because they evaporate, are absorbed, or are present in concentrations which are far too low to sustain weathering.

As a result, it often becomes necessary to treat such storage piles with coatings or encrusting agents so as to reduce emissions created by wind erosion and the like. For such purposes, latex emulsions are commonly employed as coating agents, as have a wide variety of other substances, such as lignosulfonates, asphalts, waxes, and numerous polymers. However, these agents are only useful as encrusting agents on the surfaces of inactive piles. Once such coatings are disrupted by reclamation operations or vehicular traffic, the effectiveness of such coatings is destroyed.

Sherman, in U.S. Pat. No. 4,383,971, teaches that the surface of a coal stockpile may be protected by covering the pile with straw, and then spraying a coating of asphalt emulsion on top of the straw to prevent it from blowing away. The surface can then be seeded with grass, which will grow to completely cover the surface and provide a high degree of protection. Obviously, however, such a solution is useful only for coal in "dead" storage, where the pile may remain inactive for a period of years. Thus, said pile coatings are of limited usefulness on active piles, where the surface is worked by machinery, etc. On piles with active surfaces, only the sloped perimeters where there is little traffic can be adequately protected by such a coating.

Consequently, a typical bulk material handling facility may employ several different dust control technologies in order to reduce emissions from the combination of various unit operations that make up their handling systems. The cumulative costs of such separate systems for the purpose of reducing dust emissions during unloading, conveying, stack-out to piles, storage, pile reclamation, crushing, etc. can thus be rather excessive.

In order to reduce these substantial dust control costs, so-called "residual" dust suppressants have thus been developed for the purpose of controlling emissions throughout a series of unit operations. These products are typically combinations of solutions of surfactants and foaming agents with other ingredients that can bind the dust particles together even when the moisture evaporates. Salihar, U.S. Pat. No. 4,551,261, describes, for example, a combination of foaming agent and a latex comprising an elastomeric water-miscible polymer. When this material is sprayed as a foam it is effective in reducing dust at the point of application. Furthermore, after the moisture has evaporated, the latex dries to a film which binds particulate together and prevents wind erosion during storage. Another example of such a residual dust suppressant is provided by Kittle, U.S. Pat. No. 4,561,905, which describes an oil in water emulsion applied as a foam. Other residual dust suppressants incorporating lignosulfonates, various polymers, starches, and oils are also sold commercially as residual dust suppressants.

Since the residual dust suppressant is applied to all of the material entering a particular pile, the product can thus continue to reduce emissions, and this can be true even though the pile may be very active. The residual dust suppressants thus combine water spray and coating formulations into products that are effective throughout a series of unit operations.

While the advent of residual dust suppressants has therefore been of assistance in reducing the number and types of dust control systems used in bulk material handling, they are generally quite expensive. The costs of these materials may thus range between 5 and 40 cents per ton treated, depending upon the moisture, size, and composition of the material. Furthermore, the EPA has pointed out that chemical dust suppressants are often by-products or waste materials. Some of these dust suppressants have thus been found to contain heavy metals and PCB's, and the EPA suggests that the user should analyze the dust suppressant for toxic substances, and also test for possible reactivity between the suppressant and the substrate material itself.

It therefore does not appear that ay of this prior art describes the use of cellulosic fibers as a dust suppressant. Strips of Kraft paper have been used to separate layers of coal in piles to prevent oxidation, such as in Brown, U.S. Pat. No. 2,251,321. Furthermore, sawdust has been incorporated into dust absorbing compositions to facilitate floor sweeping, as described in Wolfram, U.S. Pat. No. 892,484. In these cases, however, neither pertains to the problems of dust production during the handling and storage of bulk materials, such as coal.

SUMMARY OF THE INVENTION

In accordance with the present invention, these and other objects have now been realized by applicant's invention of a method for suppressing dust from the surface of dust-producing bulk materials which includes preparing an aqueous composition including cellulosic fibers dispersed in water and applying that aqueous composition to the surface of the dust-producing bulk material in order to suppress generation of dust from that surface. In accordance with a preferred embodiment of the method of the present invention, the aqueous composition includes between about 0.1 and 20 wt. % of these cellulosic fibers therein, preferably between about 0.1 and 10 wt. %, and most preferably between about 0.5 and 5 wt. %.

In accordance with another embodiment of the method of the present invention, the method includes preparing the aqueous composition by including polymeric emulsions or solutions therein.

In accordance with another embodiment of the method of the present invention, the cellulosic fibers are produced by the mechanical or chemical processing of wood pulp. In another embodiment, the cellulosic fibers are produced by the repulping of paper, such as newsprint. In its most preferred form, the present method includes suppressing dust from the surface of coal.

The method of the present invention can include applying the aqueous composition to the material such as coal in bulk, so as to prevent the generation of dust during handling, or alternatively as a coating to protect entire storage piles of such materials from wind erosion and the like. Furthermore, other known dust suppressants can be included along with the aqueous compositions of the present invention in order to improve their performance and/or lower the cost thereof.

It has thus been discovered that, in a particularly preferred embodiment thereof, cellulosic fibers such as mechanical or chemical fiber pulps can control dust emissions from bulk materials over prolonged periods of time. These pulps consist of suspensions of cellulosic fibers in water. When applied to a bulk material like coal, these fibers tend to bind and aggregate fine dust particles together as the moisture evaporates therefrom. These pulps can thus be used as (1) a residual dust suppressant, (2) a pile coating, and (3) as an additive with other dust suppresants.

DETAILED DESCRIPTION

The fiber pulps useful as dust suppressants in accordance with this invention can comprise such pulps which are the product of either mechanical or chemical pulping methods. In the mechanical pulping methods, mechanical pulpers or refiners grind wood chips to liberate cellulosic fibers into an aqueous suspension. In chemical pulping methods, of which the Kraft process is the most widely used, solutions of chemicals, like sodium sulfate or sulfite, are employed for the purpose of digesting the wood.

Pulps which are useful as the source of cellulosic fibers in accordance with this invention may also be manufactured by repulping paper. Mechanical digesters are thus used to grind newspring or other grades of paper into the pulps from which they were originally made. This process has a very low energy requirement, and also permits the recycling of what would otherwise be waste. For this reason, pulps prepared from newsprint or other waste paper are particularly useful for the purposes of this invention. Many bulk material handling facilities are close to metropolitan areas, where abundant and low-cost supplies of waste paper and newsprint are available. For papermaking, raw mechanical or chemical pulps are washed, bleached, or de-inked. For the purpose of this invention, the pulps employed as dust suppressants do not have to meet rigorous standards of purity, and cleaning or bleaching can thus be eliminated in order to lower the cost thereof.

Pulps useful in this invention can be prepared with solids contents up to as much as 20% by weight, i.e., from about 0.1 up to about 20 wt. %. Such concentrated pulps are, however, difficult to pump and spray. Consequently, pulps with solids contents ranging from about 0.1 to 10.0 wt. %, and more preferably from about 0.5 to 5.0 wt. % are preferably used as such dust suppressants.

The use of pulp as a dust suppressant offers several additional advantages. Firstly, the raw materials for manufacturing the pulp are extremely inexpensive and readily available, particularly as compared to ingredients which have been used for chemical dust suppressants. Secondly, pulps manufactured from wastepaper and newsprint thus result in the recycle of a material that would otherwise pollute, and which would require some other method of disposal. Thirdly, pulps are environmentally safe and biodegradable. Finally, pulps can be manufactured with readily available and simple equipment.

Examples of experimental results demonstrating that pulps are effective as a residual dust suppressant, encrusting agent and active filler now follow:

EXAMPLE 1

This example demonstrates that pulp is useful as a residual dust suppressant. In this case, three specimens of a bituminous coal screened to contain only particles of less than ¼ inch were prepared. Each of these three specimens weighed 0.900 Kg. The first coal specimen was not treated, and was thus used to establish a baseline of fugitive dust emission concentrations. The second sample was treated with 1.0 wt. % of a mechanical pulp having a solids content of 5%. The third specimen was treated with 3 wt. % of a pulp having a solids content of 1.67%. While treated specimens contained different amounts of water, the amount of fiber applied to each was the same, i.e. 0.05 wt. %. This corresponds to approximately 1 lb. of fiber per ton of material.

These treated and control specimens were then subjected to dust box tests using a method described in ASTM D547-41, "Standard Test Method for Determining the Dustiness of Coal and Coke." Specimens were dropped into a sealed container, and the impact with the base of the container produced a cloud of dust. The concentration of dust was measured and used to compare treated and control specimens.

The coal specimens were subjected to dust box tests immediately after their preparation, and also at intervals of 1, 2, 3, 4, 6, 12, and 29 days. During this period the specimens were allowed to stand in air to simulate the drying that occurs on a pile surface. Dust emissions from each sample were recorded over this entire period in order to determine the residual effectiveness of each treatment by measuring percent suppression as a function of time. Percent suppression was calculated at each test interval using the equation:

$$\% S = \frac{(D_c - D_s)}{D_c} \times 100\%$$

where $D_c$=Dust concentration measured for control, and $D_s$=Dust concentration measured for treatment specimens.

The control specimen was initially at an equilibrium moisture content of 5.5%. The treated specimens were prepared at moisture contents of 6.5% and 8.5%, respectively. As the samples dried they became dustier. After four days the surface moisture of the control had dropped to 0.91%, while the surface moistures of the treated specimens had declined to 0.86% and 0.66%, respectively. After 29 days all of the specimens had dried to 0% surface moisture. In this fashion, the interfering effects of surface moisture were eliminated, and any reduction in dust emissions was due solely to the presence of the pulp fibers. Table I lists the results of tests by tabulating percent suppression as a function of time.

TABLE I

| | | Results of Coal Dustiness Tests | | | | | | | |
|---|---|---|---|---|---|---|---|---|---|
| | | Percent Suppression Calculated on Day: | | | | | | | |
| Sample | Treatment | 0 | 1 | 2 | 3 | 4 | 6 | 13 | 29 |
| 1 | None | — | — | — | — | — | — | — | — |
| 2 | 1% of 5% pulp | — | — | 97.1 | 93.8 | 70.6 | 83.9 | 64.7 | 48.5 |
| 3 | 3% of 1.7% pulp | — | — | 100 | 94.7 | 79.7 | 71.6 | 78.0 | 54.2 |

Linear regression was used to express percent suppression as a function of time for treated samples 2 and 3. This produced the following equations, in the form $y=mx+b$:

for sample 2, $\%S=-1.28t+88.9\%$
for sample 3, $\%S=-1.33t+93.1\%$ where t=rate at which percent suppression decreases with time, expressed as %/day. Dividing the intercept, b, by the slope, m, thus permitted calculation of the amount of time required for percent suppression to decrease to 0%. For sample 1, this figure was 69 days, and for sample 2, 70 days.

From these test results it was concluded that pulp fibers are effective residual dust suppressants which persist in activity up to 70 days, at least under the conditions of this experiment. It was also concluded that the amount of water added with the pulp was not critical, so long as there was sufficient liquid to adequately distribute the fibers.

EXAMPLE 2

This example demonstrates that pulp is an effective dust suppressant coating for stockpiles of bulk material. Two 150 lb. samples of coal were placed into test bins measuring 24"L×26"W×10"H, and their surfaces were mounded into a roughly conical shape. The surface of one sample was coated with a 5% pulp, corresponding to a treatment rate of 3.3 gallons per 1000 ft². The surface of the second sample was not coated. Both piles of coal were placed outdoors and allowed to weather for a period of 30 days. During this period, both test piles were subjected to the same conditions of wind and rain erosion. Visual examination of the coated surface revealed that pulp fibers had dried to form a crust on the surface, which persisted throughout the test.

After 30 days, a size distribution analysis was conducted on surface samples from each pile. The coal used in each bind and originated from the same homogeneous master sample. Therefore, any decline in the amount of fine material at the surface after 30 days was indicative of the amount of wind and rain erosion. Wind erosion washes it down to the base of the pile. Table II shows the results of size distribution analyses performed on specimens taken from the top ¼" of the surface

TABLE II

Size Distribution Analyses

| U.S. Standard Sieve Size | Initial Size Distribution (wt. %) | Size Distribution after 30 Days | |
|---|---|---|---|
| | | Untreated Surface (wt. %) | Coated with Pulp (wt. %) |
| + 1.4 | 16.1 | 13.4 | 3.5 |
| −1.4 + 5 | 12.2 | 18.3 | 13.2 |
| −5 + 10 | 19.7 | 36.6 | 30.5 |
| −10 + 30 | 25.4 | 22.6 | 28.5 |
| Total + 30 | 73.4% | 90.9% | 75.7% |
| −30 + 60 | 14.6 | 3.8 | 10.0 |
| −60 + 100 | 4.7 | 1.5 | 4.3 |
| −100 + 200 | 4.1 | 1.3 | 3.7 |
| −200 | 3.2 | 2.3 | 6.1 |
| Total − 30 | 26.6% | 8.9% | 24.1% |

In accordance with these test results, the untreated pile surface showed a pronounced decrease in fine particulate after 30 days of outdoor storage. The weight percent of particles below 30 mesh (about 1 mm.) declined from 26.6% to only 8.9% as a result of wind and rain erosion. No similar or significant change was observed for the test pile coated with pulp in accordance with this invention.

Treated and untreated pile surfaces were also vacuumed to determine whether less fine material would be swept from the coated surface. A 5 mesh screen of 7.75" in diameter was placed onto the surface of each pile, and a small vacuum cleaner was used to sweep coal through the screen for one minute. The amount of dust was collected and weighed. Table III lists the results of the test.

TABLE III

Surface Vacuuming Test Results

| Sample | Test No. | Treatment | Amount of Dust Collected (gm) |
|---|---|---|---|
| 1 | 1 | Untreated | 1.7 |
| | 2 | Untreated | 1.5 |
| | | | Average 1.6 |
| 2 | 1 | Coated with 5% pulp | 0.4 |
| | 2 | Coated with 5% pulp | 0.7 |
| | | | Average 0.55 |

These results demonstrate that 65% less particulate was vacuumed from the coal pile surface coated with an aqueous suspension of pulp fibers. The coating was also observed to retain its integrity over the thirty day test period. The fibrous mat intertwining fine coal particles could be lifted from the surface of the pile as a demonstration of the protection afforded the surface against wind and rain erosion.

EXAMPLE 3

This example demonstrated that pulp is also useful as an additive to other encrusting formulations. Latex is a common film-forming agent that has been used to coat stockpile surfaces as a means of protection against the elements. Varying percentages of pulp fiber were thus added to a common latex being sold as a dust suppressant, and the resulting mixtures were cast into thin films. The films of each composition were removed from the substrate and cut into strips 2 inches long and ¼" wide. These strips were then tested in tension to determine the force required to break them. In this fashion it could be determined whether the addition of pulp fibers contributed to strengthening the film. Test data is tabulated in Table IV.

TABLE IV

Strengths of Latex Films Containing Pulp Fibers

| Sample | No. of Tests | Composition | | | Fiber Content % | Tensile Strength gm/mm$^2$ |
|---|---|---|---|---|---|---|
| | | Latex (40% solids) gms. | Pulp (5% solids) gms. | Water gms. | | |
| 1 | 7 | 20 | 180 | 0 | 4.50 | 1145 ± 147 |
| 2 | 9 | 20 | 90 | 90 | 2.25 | 4627 ± 1052 |
| 3 | 9 | 20 | 9 | 171 | 0.23 | 1939 ± 575 |
| 4 | 3 | 20 | 0.9 | 179.1 | 0.02 | 1304 ± 502 |
| 5 | 3 | 20 | 0 | 180 | 0.0 | 1088 + 47 |

These results demonstrate that as the amount of fiber in the film increased, the tension strength rose to a maximum, and then declined. Over the range of from 0 to 4.5% fiber content all values of tensile strength are well above that of the latex film alone. Even as little as 0.02% fiber increased the film strength by 19.8%. The addition of 2.25% fiber to the formulation increased the tensile strength by a factor of 4.25. One would intuitively expect to see a similar increase in tensile strength with other coating agents where the pulp fibers are able to reinforce a polymeric film.

It should also be appreciated that cellulosic fibers can be used to reinforce and improve other film-forming and adhesive dust suppressants in addition to latex emulsions. These can include, for example, asphalt emulsions, lignosulfonates, molasses, and other such polymeric materials that are water soluble or dispersable. Latex was selected for use in the above example because it is the most commercial significant pile coating agent.

In summary, the experimental data of examples 1, 2, and 3 show that (1) pulps can significantly reduce the dusting of coal and other materials when applied in an amount approximating 1 pound of fiber per ton, (2) pulps applied to the surfaces of stockpiles reduce wind and rain erosion, and (3) pulps can be used as a reinforcing filler in other dusts suppressant formulations.

The present invention can therefore offer several advantages as a dust suppressant. Firstly, pulps are very inexpensive as compated to dust suppressant products formulated with specialty chemicals, and therefore the costs to the end-user will decrease thus providing a stronger incentive to control fugitive dust emissions. Secondly, pulps useful as dust suppressants can be manufactured from waste products, such as newsprint, and recycled materials that would require less desirable methods of disposal. Thirdly, pulp fibers are combustible or biodegradable, and as such their use is environmentally compatible.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

I claim:

1. A method for suppressing dust from the surface of a bulk coal material comprising:
   preparing an aqueous suspension consisting essentially of between about 0.1 and 20 weight percent cellulosic fibers dispersed in water; and
   applying said aqueous suspension to the surface of said coal in an amount of at least about one pound of cellulosic fiber per ton of coal so as to substantially suppress the generation of said coal dust from said coal through binding of the fibers and formation of a crust on the surface of said coal, sufficient to cause less than about a 10% reduction in the weight of coal particles below 30 mesh after 30 days of storage.

2. The method of claim 1 wherein said cellulosic fibers are produced by the mechanical or chemical processing of wood pulp.

3. The method of claim 1 wherein said cellulosic fibers are produced by the repulping of paper.

4. The method of claim 3 wherein said paper comprises newsprint.

5. The method of claim 1 including preparing said aqueous suspension by including between about 0.1 and 10 wt. % of said cellulosic fibers therein.

6. The method of claim 5 including preparing said aqueous suspension by including between about 0.5 and 5 wt. % of said cellulosic fibers therein.

7. A method of suppressing coal dust from the surface of a bulk coal material comprising:
   preparing an aqueous suspension consisting essentially of between about 0.1 and 20 weight percent cellulosic fibers dispersed in water and a polymeric film-forming emulsion; and
   applying said aqueous suspension to the surface of said coal in an amount of at least about one pound of cellulosic fiber per ton of coal so as to substantially suppress the generation of said coal dust from said coal through binding of the fibers and formation of a crust on the surface of said coal, sufficient to cause less than about a 10% reduction in the weight of coal particles below 30 mesh after 30 days of storage.

8. The method of claim 7, wherein said polymeric emulsion comprises a latex emulsion.

* * * * *

UNITED STATES PATENT AND TRADEMARK OFFICE
CERTIFICATE OF CORRECTION

PATENT NO. : 4,836,945

DATED : June 6, 1989

INVENTOR(S) : Mark O. Kestner

It is certified that error appears in the above-identified patent and that said Letters Patent is hereby corrected as shown below:

Column 4, line 45, "newspring" should read --newsprint--.
Column 6, line 62, "bind" should read --bin--.
Column 6, line 66, after "erosion" insert --blows fine material
    from the surface, and rain erosion--.
Column 8, line 25, "tension" should read --tensile--.
Column 8, line 52, "compated" should read --compared--.

Signed and Sealed this

Twentieth Day of March, 1990

Attest:

JEFFREY M. SAMUELS

Attesting Officer

Acting Commissioner of Patents and Trademarks